(12) United States Patent
Karl

(10) Patent No.: US 10,295,414 B2
(45) Date of Patent: May 21, 2019

(54) METHOD FOR DETERMINING A COIL TEMPERATURE OF AN ELECTRIC MACHINE

(71) Applicant: AUDI AG, Ingolstadt (DE)

(72) Inventor: Bernhard Karl, Muhr am See (DE)

(73) Assignee: Audi AG, Ingolstadt (DE)

( * ) Notice: Subject to any disclaimer, the term of this patent is extended or adjusted under 35 U.S.C. 154(b) by 644 days.

(21) Appl. No.: 14/932,533

(22) Filed: Nov. 4, 2015

(65) Prior Publication Data

US 2016/0131534 A1     May 12, 2016

(30) Foreign Application Priority Data

Nov. 6, 2014   (DE) .......................... 10 2014 016 452

(51) Int. Cl.
| | | |
|---|---|---|
| *H02K 21/14* | (2006.01) | |
| *G01K 7/00* | (2006.01) | |
| *G01K 7/16* | (2006.01) | |

(52) U.S. Cl.
CPC ................. *G01K 7/00* (2013.01); *G01K 7/16* (2013.01); *G01K 2205/00* (2013.01); *G01K 2217/00* (2013.01)

(58) Field of Classification Search
CPC .......... G01K 13/08; G01K 7/36; G01K 13/04; H02K 21/14; H02K 16/04
USPC ................. 374/141, 144, 152, 153, 163, 183
See application file for complete search history.

(56) References Cited

U.S. PATENT DOCUMENTS

| | | | | |
|---|---|---|---|---|
| 4,413,326 | A | | 11/1983 | Elfner et al. |
| 4,517,483 | A | * | 5/1985 | Hucker ................. H02K 1/278 310/156.57 |
| 4,663,582 | A | * | 5/1987 | Fujii ........................ H02P 9/14 322/52 |
| 4,879,497 | A | | 11/1989 | Meyer et al. |
| 6,441,624 | B1 | * | 8/2002 | Bronold ............ H01M 8/04305 324/426 |
| 7,042,181 | B2 | * | 5/2006 | Nagakura ............... H02M 7/48 318/434 |
| 8,494,801 | B2 | * | 7/2013 | Pushkolli ................. B60K 6/48 702/99 |

(Continued)

FOREIGN PATENT DOCUMENTS

| | | |
|---|---|---|
| CN | 101328897 | 12/2008 |
| CN | 102052974 | 5/2011 |

(Continued)

OTHER PUBLICATIONS

Chinese Search Report dated Sep. 29, 2017 with respect to counterpart Chinese patent application 2015107524479.

(Continued)

*Primary Examiner* — Gail Kaplan Verbitsky
(74) *Attorney, Agent, or Firm* — Henry M. Feiereisen LLC

(57) ABSTRACT

A method for determining an actual temperature of a coil of an electric machine, includes detecting a voltage in a no-load state of the electric machine; detecting a current strength in an induced short circuit state of the electric machine; calculating an actual stator coil resistance as a function of the voltage detected during the no-load state and the current strength detected during the active short circuit" state; and calculating the actual temperature of the coil of the electric machine as a function of the actual stator coil resistance.

8 Claims, 1 Drawing Sheet

(56) References Cited

U.S. PATENT DOCUMENTS

| | | | |
|---|---|---|---|
| 8,988,019 B2 * | 3/2015 | Funabashi | A01D 34/78 173/217 |
| 9,561,738 B2 * | 2/2017 | Ogawa | B60L 3/04 |
| 9,729,134 B2 * | 8/2017 | Moen | H01H 9/54 |
| 9,787,226 B2 * | 10/2017 | Toba | H02P 6/28 |
| 9,938,809 B2 * | 4/2018 | Okoniewski | E21B 43/2401 |
| 2003/0048087 A1 | 3/2003 | Schulter | |
| 2006/0138979 A1 * | 6/2006 | Kuribayashi | H02K 11/048 318/139 |
| 2007/0018606 A1 * | 1/2007 | Iura | H02P 21/141 318/807 |
| 2009/0167236 A1 * | 7/2009 | Kono | B60L 9/00 318/806 |
| 2010/0091815 A1 | 4/2010 | Nakazato et al. | |
| 2011/0012637 A1 * | 1/2011 | Hobelsberger | G01R 31/34 324/765.01 |
| 2011/0119014 A1 * | 5/2011 | Pushkolli | B60K 6/48 702/99 |
| 2011/0133677 A1 * | 6/2011 | Franke | B60L 11/1887 318/400.3 |
| 2011/0175478 A1 * | 7/2011 | Sakai | H02K 1/2766 310/156.01 |
| 2012/0242259 A1 * | 9/2012 | Funabashi | H02K 21/24 318/139 |
| 2012/0274244 A1 * | 11/2012 | Funabashi | A01D 34/78 318/139 |
| 2012/0306422 A1 * | 12/2012 | Hao | G01K 7/22 318/490 |
| 2014/0156130 A1 * | 6/2014 | Ogawa | B60L 3/04 701/22 |
| 2014/0204973 A1 * | 7/2014 | Kinoshita | G01K 13/00 374/152 |
| 2015/0375733 A1 * | 12/2015 | Limbacher | B60W 10/10 701/22 |
| 2016/0308484 A1 * | 10/2016 | Engstrom | H02P 29/005 |
| 2018/0187535 A1 * | 7/2018 | Okoniewski | E21B 43/2401 |

FOREIGN PATENT DOCUMENTS

| | | |
|---|---|---|
| CN | 103869170 | 6/2014 |
| DE | 3111818 A1 | 4/1982 |
| DE | 3736303 C2 | 11/1989 |
| DE | 10254295 A1 | 6/2004 |
| DE | 102008001807 A1 | 11/2009 |
| EP | 1180671 | 2/2002 |
| EP | 1249060 B1 | 10/2002 |
| EP | 1858131 | 11/2007 |
| JP | 2004-77245 | 3/2004 |
| WO | WO 2015/090306 A1 | 6/2015 |

OTHER PUBLICATIONS

Translation of Chinese Search Report dated Sep. 29, 2017 with respect to counterpart Chinese patent application 2015107524479.

* cited by examiner

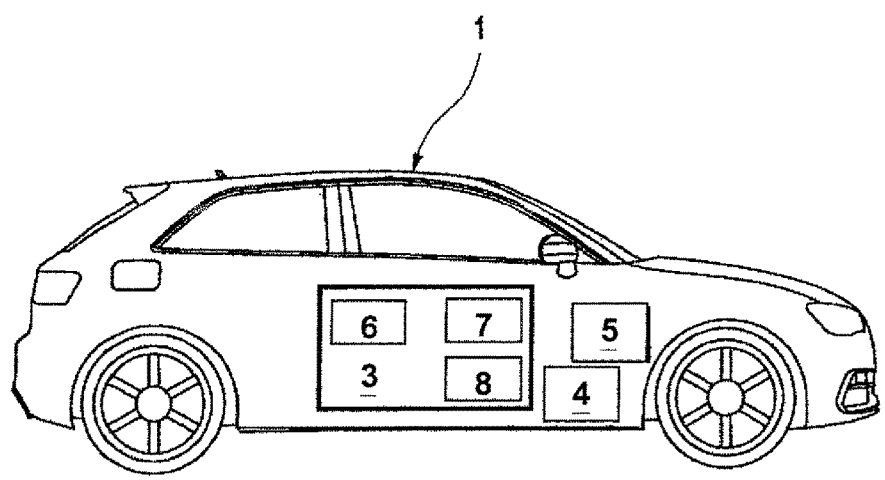

METHOD FOR DETERMINING A COIL TEMPERATURE OF AN ELECTRIC MACHINE

CROSS-REFERENCES TO RELATED APPLICATIONS

This application claims the priority of German Patent Application, Serial No. 10 2014 016 452.7, filed Nov. 6, 2014, pursuant to 35 U.S.C. 119(a)-(d), the disclosure of which is incorporated herein by reference.

BACKGROUND OF THE INVENTION

The present invention relates to a method or determining a temperature of coils of an electric machine and a vehicle with a control device, which is configured for implementing the disclosed method The following discussion of related art is provided to assist the reader in understanding the advantages of the invention, and is not to be construed as an admission that this related art is prior art to this invention.

Electric machines such as three-phase motors usually include coils, which during operation are alternately energized, i.e., supplied with electricity, and as a result cause movement of a rotor or armature. As a result of the current conducted through the coils, the coils heat up, which may cause damage to the electric machine.

In order to protect the electric machine from damage due to overheating, an actual temperature of a respective electric machine, in particular a temperature of coils of the electric machine, has to be monitored and the electric machine turned off if needed.

For detecting the actual temperature of an electric machine, temperature sensors can be used, which however, present costs and are subject to measuring variances so that corresponding measurements inherently suffer from inaccuracies.

SUMMARY OF THE INVENTION

According to one aspect of the present invention, a method for determining an actual temperature of a coil of an electric machine, includes detecting a voltage in a no-load state of the electric machine; detecting a current strength in an induced short circuit state of the electric machine; calculating an actual stator coil resistance as a function of the voltage detected during the no-load state and the current strength detected during the active short circuit" state; and calculating the actual temperature of the coil of the electric machine as a function of the actual stator coil resistance.

The method is based on a calculation of a temperature by means of operating parameters determined in different operating states of a respective electric machine. In particular the disclosed method provides that the respective electric machine is switched into a state "no-load" in which the electric machine does not perform work, and into a state "active short circuit" in which respective connection lines of the electric machine are briefly bridged, i.e., connected with each other.

In the context of the present invention the term operating parameter means a measure of a value to be measured during operation of an electric machine, in particular an induced voltage and an induced current strength.

According to another advantageous feature of the present invention aspect of the present invention the method further includes calculating a magnetic flux during the no-load state as a function of the detected voltage, and during active short circuit state calculating the actual stator coil resistance as a function of the actual magnetic flux and the current strength detected during the active short circuit state.

The states "active short circuit" and "no-load" are particularly suited for calculating respective actual properties, such as a temperature of an electric machine, because in the state "active short circuit" an actual voltage input of the electric machine assumes the value zero and in the state "no-load" a current strength input of the respective electric machine assumes the value zero. Because as explained above constant values for voltage and current strength are present in the respective states "active short circuit" and "no-load", equations for calculating properties of the respective electric machine can be resolved via these values.

When switching an electric machine into the state "no-load", semiconductors of a power electronics of the electric machine are blocked, so that a current no longer flows and the voltage corresponds to a voltage induced by rotating permanent magnets or to a corresponding magnetic flux $\varphi_{PM}$. Further the voltage depends on a rotational speed $\omega_{el}$ and an actual temperature of the permanent magnets. Correspondingly an actual magnetic flux can be concluded based on a voltage determined during the state "no-load", because the magnetic flux is proportional to an applied voltage, as described in formula (1), $$U_{LLK} = \varphi_{PM} * \omega_{el}. \tag{1}$$

wherein:

$U_{LLK}$=no-load voltage [V], $\omega_{el}$=2*π*rotational speed [1/s].

When the rotational speed and the voltage, for example determined with a voltage sensor are known, the magnetic flux density $\Psi_{PM}$ can be calculated according to the formula (2):

$$\Psi_{PM} = \frac{U_{LLK}}{\omega_{el}} \tag{2}$$

By switching an electric machine into the state "active short circuit" an actual coil resistance can be concluded at known magnetic flux by way of an induced current strength, because the coil resistance changes in dependence on magnetic flux and induced current strength as described in formula (3):

$$I_{AKS} = \sqrt{(((p^2 4 * \pi^2 * n^2/3600 * L_S * \Psi_{PM})/(R_S^2 + p^2 * 4\pi^2 n^2/3600 * L_S^2))^2 + ((2p\pi * n/60 * R_S * \Psi_{PM})/(R_S^2 + p^2 * 4\pi^2 * n^2/3600 * L_S^2))^2)} K/\sqrt{2} \tag{3}$$

wherein:

$I_{AKS}$=short circuit current [A]
$\Psi_{PM}$=flux linkage, i.e., magnetic flux density (root mean square indicator) [Vs]
p=pole pair number
n=rotational speed [1/min]
$L_S$=phase inductivity [H]
$R_S$=phase resistance [Ohm]
K=delta connected electric machine, with Delta=√(3) or electric machine connected in star with Delta=1.

By means of a known magnet temperature, the stator coil resistance $R_S$ can be determined with equation (3), by way of which a coil temperature of the stator $T_{Stator}$ can be calculated in combination with the temperature coefficients of copper $\alpha_{cu}$.

Because the temperature of a respective coil, and with this the temperature of a respective electric machine, changes in dependence on an actual coil resistance and an actual magnetic flux, the temperature of the respective coil or the respective electric machine can be concluded via the operating parameters magnetic flux and current strength.

An actual temperature of a respective electric machine can be calculated by a sequence of measurements for voltage and current strength in the state "no-load" or "active short circuit" for example by using the formula (4):

$$T_{Stator} = \frac{\frac{R_S}{R_{S\_20}} - 1}{\alpha_{cu} + 20} \quad (4)$$

wherein:
$T_{Stator}$=coil temperature of the stator
$R_{S\_20}$=phase resistance at 20° C. [Ohm]
$\alpha_{cu}$=temperature coefficient of copper=3.9e−3 [1/K]

It is conceivable that the disclosed method is performed by using any appropriate operating parameter or a corresponding combination of operating parameters of an electric machine, which changes in dependence on the temperature.

For performing the method in a vehicle, tables or values required for the calculation of respective values by formulas (1) to (4) can be stored in a control device for example via characteristic diagrams, wherein for example a first characteristic diagram $\Psi_{PM}$ is defined by a magnet temperature and rotational speed of the machine (on the test stand), wherein the rotational speed is plotted on a first axis, the magnet temperature, i.e., permanent magnet temperature, is plotted on a second axis and the flux linkage $\Psi_{PM}$ is plotted on a third axis.

Further for example a second characteristic diagram $I_{AKS}$ can be stored in the control device, which is defined by the axes coil temperature, magnet temperature and short circuit current $I_{AKS}$.

Individual values, such as $R_{S\_20}$, p and $L_S$ are normally already stored in a control device required for operating the electric machine.

According to another advantageous feature of the invention, the vehicle is a hybrid vehicle having an internal combustion engine and is driven by the internal combustion engine when switching into the state "no-load" and/or the state "active short circuit".

Because the disclosed method is based on the change between states, i.e., operating states, of an electric machine, the drive motor, when performing the invention for a drive motor of a vehicle, the drive can not be operated continuously in a coasting mode. In order to avoid loss of thrust as a result of performing the disclosed method, in hybrid vehicles or vehicles with multiple drive units it is provided that during the performance of the disclosed method a secondary drive, such as an internal combustion engine or a drive unit provided in addition to the drive unit to be measured by the disclosed method, increases its power output so that a temporary loss thrust provided by the electric machine is compensated.

According to another advantageous feature of the present invention, the determined temperature can be used as a starting input value for a model for calculating an actual temperature of the electric machine.

In order to determine an operating temperature of a machine also without a temperature sensor, temperature models can be used that mathematically model a temperature course of a respective machine, such as an electric machine, and thereby simulate the temperature course, so that the temperature can be calculated for every operating point of a machine. A disadvantage of such temperature models results in a so-called "hot start" in which a respective machine heats up during operation, is turned off and is then started again after a short period of time. Because a start temperature in such a hot start differs form the ambient temperature the start temperature is not known so that a respective temperature model does not have a start value and thus provides inaccurate results.

The disclosed method illustrates the possibility to provide a start value for a temperature model also in the case of a hot start. By calculating an actual coil temperature during a start phase the start value can be quickly determined and used as basis for a simulation or modeling in the further course during operation of a respective electric machine.

According to another aspect of the present invention a vehicle includes a control device which is configured to determine an actual temperature of an electric machine, wherein the control device is configured to calculate an actual stator coil resistance in dependence on a voltage to be detected during a state "no-load" of the electric machine and a current strength to be detected during a state "active short circuit" of the electric machine and to use the actual stator coil resistance to calculate the actual temperature of the coil of the electric machine.

The control device is configured for implementing the disclosed method. This means that the control device switches a respective electric machine of the vehicle, for example a three-phase motor, first into a state "no-load" and detects an induced voltage in the state "no-load" for example by using a voltmeter. Subsequently the control device switches the electric machine into a state "active short circuit" and detects, for example by using an ampere meter, and induced current strength. By way of the determined voltage and current, the control device calculates the actual temperature of a coil of the electric machine.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 shows a schematic representation of a possible configuration of the method according to the invention in a vehicle.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows a vehicle 1 including an electric machine 3 with a stator coil 6, an internal combustion engine 4, and a control device 5. In order to determine a temperature of the electric machine 3, the electric machine 3 is first switched into a state "no-load" by the control device 5 by blocking semiconductors of a power electronics 7 of the electric machine 3, whereupon the control device detects a voltage induced in the state "no-load" and thereafter switches the electric machine into a state "active short circuit". While the electric machine 3 is switched in the state "active short circuit" the control device 5 detects by way of sensors 8 an induced short circuit current, i.e., an induced current strength and via the detected voltage and the detected short circuit current calculates the actual temperature of the electric machine 3.

For this a magnetic flux is calculated via a voltage measured at a defined rotational speed for example in the freewheel of the electric machine. By means of the magnetic flux an actual stator coil resistance $R_S$ can be concluded via formula (3) at known current strength. Because the stator coil resistance. $R_S$ changes in dependence on an actual temperature the actual temperature of the electric machine or the stator coil can be concluded via the stator coil resistance $R_S$ via formula (4).

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for determining a temperature of a stator coil of an electric machine, comprising:
    measuring in a no-load state of the electric machine an open-circuit voltage across the stator coil of the electric machine;
    determining from the measured open-circuit voltage a magnetic flux through the stator coil;
    shorting the stator coil of the electric machine to produce an induced short circuit state and measuring in the induced short circuit state a short-circuit current strength;
    calculating a stator coil resistance as a function of the magnetic flux determined during the no-load state and the short-circuit current strength measured during the induced short circuit state; and
    calculating the temperature of the stator coil of the electric machine as a function of the stator coil resistance.

2. The method of claim 1, further comprising switching the electric machine into the no-load state for determining the voltage and subsequently switching the electric machine into the induced short circuit state for determining the induced current.

3. The method of claim 2, further comprising driving a vehicle with the electric machine and switching the electric machine into the no-load state and/or the short circuit state during coasting mode of the vehicle.

4. The method of claim 3, wherein the vehicle is a hybrid vehicle comprising an internal combustion engine, and wherein the method further comprises driving the vehicle with the internal combustion engine when switching into the no-load state and/or the induced short circuit state.

5. The method of claim 1, wherein the temperature of the electric machine is calculated using a model.

6. A vehicle comprising a control device configured to determine a temperature of a stator coil of an electric machine, said control device being configured to block semiconductors of a power electronics of the electric machine and measure in a no-load state of the electric machine an open-circuit voltage across the stator coil of the electric machine, to determine from the measured open-circuit voltage a magnetic flux through the stator coil, to switch the electric machine into an induced short circuit state and measure in the induced short circuit state a short-circuit current strength, to calculate a stator coil resistance as a function of the magnetic flux determined during the no-load state and the short-circuit current strength measured during the induced short circuit state, and to calculate the temperature of the coil of the electric machine as a function of the stator coil resistance.

7. The vehicle of claim 6, further comprising at least one sensor for detecting the open-circuit voltage and/or the short-circuit current strength.

8. The vehicle according to one of the claim 6, wherein the electric machine is a three-phase electric machine.

* * * * *